M. ROBINSON.
OUTLET BOX.
APPLICATION FILED JUNE 25, 1915.
1,323,408.  Patented Dec. 2, 1919.
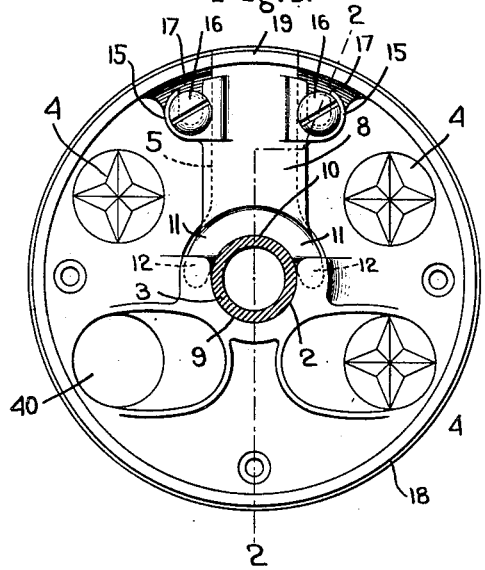
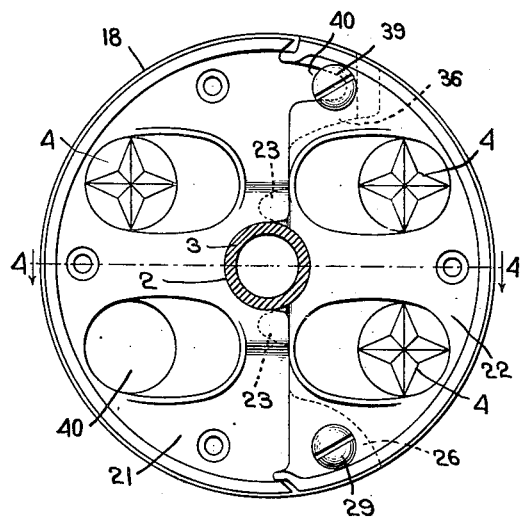
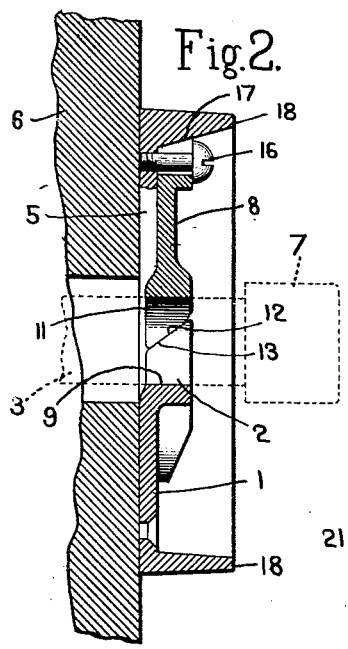
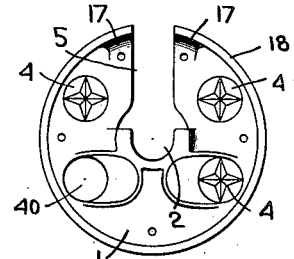
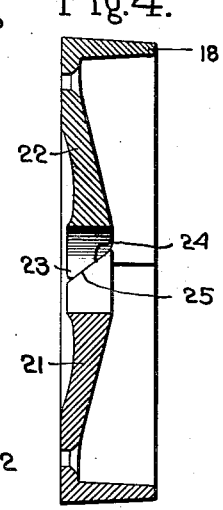
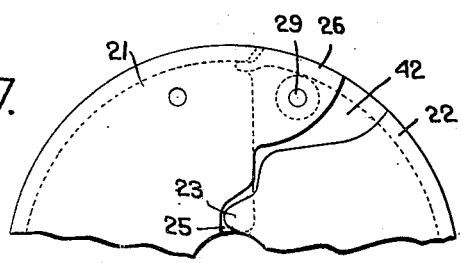
Inventor.
Miner Robinson,
by Heard Smith & Tennant.
Atty's.

UNITED STATES PATENT OFFICE.

MINER ROBINSON, OF NEWTON, MASSACHUSETTS.

OUTLET-BOX.

1,323,408.   Specification of Letters Patent.   Patented Dec. 2, 1919.

Application filed June 25, 1915. Serial No. 36,356.

*To all whom it may concern:*

Be it known that I, MINER ROBINSON, a citizen of the United States, residing at Newton, county of Middlesex, State of Massachusetts, have invented an Improvement in Outlet-Boxes, of which the following description, in connection with the accompanying drawing, is a specification, like characters on the drawing representing like parts.

This invention relates to outlet boxes and particularly to those which are used in a building that is provided with gas piping as well as with wiring for an electric lighting system. In buildings which are both piped for gas and wired for electricity, it is customary to associate the outlet boxes for the electric wiring with the gas piping at the point where it comes through the walls for the attachment of the lighting fixtures. During the process of building construction it is the practice first to install and test the gas-piping system before the electric wiring is installed. When the gas-piping system is installed, the ends of the piping are left protruding through the wall for the purpose of permitting the lighting fixture to be subsequently attached and these protruding ends are closed by a cap. When the electric wiring is installed it is the practice to place an outlet box over the protruding end of the pipe into which the wires are led for connection with the wires of the lighting fixture.

It is a requirement that the outlet box should be bonded to or grounded on the gas-piping system, and this is sometimes done by making the outlet box with a hole through which the end of the gas pipe extends which is of a size to snugly fit the gas pipe. To place an outlet box of this nature in position necessitates the removal of the cap on the pipe, and in many localities it is contrary to the requirements for any one but a licensed gas fitter to remove the cap from the gas pipe after the piping system has been inspected and passed. Hence with this construction it is necessary that a licensed gas fitter should work in conjunction with the electrician in installing the outlet boxes, the gas fitter's duty being simply to remove the caps from the ends of the pipes and then to place them back in position again after the outlet box is installed.

In my prior Patent No. 1,140,917, dated May 25, 1915, I have illustrated an outlet box which is provided with a pipe-receiving aperture of sufficient size to slip over the cap or the end of the gas pipe, thus avoiding the necessity of removing the cap in order to install the outlet box. In order to provide the necessary bonding between the outlet box and the gas pipe said outlet box is provided with a combined sealing and bonding member which is constructed to close the portion of the pipe-receiving opening not occupied by the pipe and to bond the outlet box to the pipe.

Under some conditions it may not be convenient to provide an outlet box with a pipe-receiving aperture of sufficient size to slip over the cap on the end of the pipe, and it is the object of my present invention to provide a novel outlet box having a pipe-receiving aperture of a diameter to receive the gas pipe and yet which is constructed so that it can be installed in position without removing the cap from the end of the gas pipe. I accomplish this object herein by providing the outlet box with an opening or passage extending from the periphery of the outlet box to the pipe-receiving aperture and which is of sufficient size to permit the pipe to pass therethrough. With this construction the outlet box can be installed in position by a movement laterally relative to the pipe to cause the pipe to enter said opening laterally. The requisite bonding of the outlet box to the gas pipe is secured by a clamping member which is constructed to close the opening and clamp the pipe against the wall of the pipe-receiving aperture.

In order to give an understanding of my invention I have illustrated in the drawings a selected embodiment thereof which will now be described, after which the novel features will be pointed out in the appended claims.

Figure 1 is a plan view of an outlet box embodying my invention;

Fig. 2 is a section on the line 2—2, Fig. 1;

Fig. 3 is a view showing a different embodiment of my invention;

Fig. 4 is a section on the line 4—4, Fig. 3;

Fig. 5 is a fragmentary detail showing the coöperating wedging surfaces;

Fig. 6 is a view of the outlet box shown in Fig. 1 with the sealing and bonding member removed.

Fig. 7 is a partial underside view of the outlet box;

Fig. 8 is a perspective view of one of the sections of the outlet box shown in Fig. 1.

In the construction shown in Figs. 1 and 2 the outlet box is designated generally by 1 and it is provided with the central pipe-receiving aperture 2 through which the gas pipe 3 is adapted to extend. The outlet box is also provided with removable portions 4 which can be broken out to form conduit-receiving openings 40 through which the wire-receiving conduits are introduced into the box as usual in outlet boxes. In the construction shown in Figs. 1 and 2 the outlet box is provided with a pipe-receiving opening 5 which extends from the periphery of the box to the pipe-receiving aperture 2 and which is of sufficient width to permit the pipe 3 to be passed laterally therethrough. The outlet box formed with this opening 5 can be placed in position against the backing board 6 and without removing the cap 7 from the gas pipe 3 by a lateral movement of the outlet box relative to the pipe in a direction to permit the pipe 3 to pass through the opening 5. The complete outlet box also comprises a member 8 of a size and shape to fill the opening 5 and which when in position not only closes said opening but serves to clamp the pipe 3 firmly against the wall 9 of the pipe-receiving aperture. This member or element 8 may have various constructions but I will preferably so make it that the means for clamping it in position and securing it to the main body of the box effects the clamping of the pipe against the wall 9. In the construction shown in Figs. 1 and 2 the member 8 has its inner end 10 shaped to partially embrace the pipe 3, said end presenting two arms 11 between which the pipe 3 is received. The ends of these arms are provided with the bevel surfaces 12 which engage corresponding beveled surfaces 13 formed on the outlet box 1.

The outer end of the member 8 is shown as provided with one or more ears 15 which overlie the bottom of the box and which are adapted to receive clamping screws 16 that screw into the box bottom and which serve to hold the member 8 firmly in place. The outer end of the member 8 also has engagement with a wedging or tapered surface 17 formed on the interior of the usual flange 18 of the outlet box so that when the clamping screws 16 are tightened up the member 5 will be forced toward the pipe-receiving aperture 2 and will operate to clamp the pipe 3 firmly between the portion 10 of the member 8 and the wall 9, thus effecting the necessary bonding action. The outer end of the member 8 will preferably be provided with a flange section 19 which closes the gap in the flange 18 caused by the opening 5.

The pipe-receiving aperture 2 will preferably be so situated that when the pipe 3 is against the wall 9 thereof said pipe will be concentrically located in the outlet box although this is not essential.

An outlet box having the above construction presents an opening leading from the periphery thereof to the space occupied by the gas pipe through which the pipe can be inserted laterally. It also involves an element for closing the opening thus formed and for clamping the gas pipe to the outlet box. Such an outlet box can be considered as a sectional outlet box comprising a plurality of separable sections between which the gas pipe is received and constructed to be applied to the pipe by separating the sections sufficiently to permit the box to be slipped laterally into position. The sections are also constructed so that when they are clamped together the gas pipe will be firmly clamped between them, thus effecting the desired bonding action. In the embodiment shown in Figs. 1 and 2, one of the sections of the box is much larger than the other, but the relative sizes of these sections is immaterial to the invention.

I have shown in Figs. 3 and 4 an embodiment of the invention wherein the two sections of the box are more nearly of the same size than they are in Figs. 1 and 2. In this embodiment the outlet box is divided to provide the two sections 21 and 22 which when placed together in proper relation to each other form between them the pipe-receiving aperture 2 of a size to receive the pipe 3. These box sections 21 and 22 are provided with coöperating wedging surfaces constructed so that when the two sections are clamped together the wedging surfaces coöperate to clamp the two sections firmly about the gas pipe 3. This result may be provided for in various ways without departing from the invention. As illustrated, the section 22 is provided with the two projections 23, one on either side of the pipe-receiving aperture 2 and each of which is provided with the wedging surfaces 24 adapted to engage a coöperating surface 25 formed on the section 21.

The section 21 is shown as provided with the extensions 26 and 36 that overlie the section 22, each extension being formed with the wedging surface 27 to engage a corresponding wedging surface 28 formed on the section 22, as best seen in Fig. 5. The sections are secured together by two screws 29 and 39, the screw 29 extending through the section 22 into the extension 26 on the section 21, and the screw 39 extending through a notch 40 formed in the section 22 and screwing into the extension 36. When the screws 29 and 39 are tightened, the wedging surfaces 27 and 28 coöperate to draw the two sections toward each other and thus to clamp them firmly to the pipe 3.

The outlet box can be readily applied to a pipe by loosening the screw 39 and then opening the two sections away from each other about the screw 29 as a pivot sufficiently to permit the device to be applied laterally to the pipe. After the outlet box is in position the two sections are swung together and the screw 39 is tightened, thus clamping the device firmly about the pipe. The section 22 is cut away at 42 to permit the two sections to be opened away from each other without any interference between the end of the extension 26 and the wall of the recess in which said extension is received.

While I have illustrated herein two different embodiments of my invention, yet I wish to state that both of these are merely illustrative of the principle of the invention and that the latter may be embodied in other shapes and constructions than those herein illustrated.

I claim:

1. An outlet box or plate having a pipe-receiving opening extending from the central portion thereof through the periphery whereby a pipe can be introduced laterally into said opening, and a combined clamping and sealing member for closing the portion of the opening not occupied by the pipe and for clamping said pipe in said opening.

2. The combination with a pipe, of an outlet box having a pipe-receiving opening extending from substantially the central portion thereof to the periphery, said outlet box also having a wedging surface, and a combined clamping and sealing member shaped to close the portion of the opening not occupied by the pipe, and means to clamp said member between said surface and the pipe.

3. The combination with a pipe, of an outlet box or plate having a pipe-receiving opening extending from the central portion thereof through the periphery, a portion of the wall of said opening being so situated that when the pipe is placed thereagainst it will be concentric to the box, and a combined clamping and sealing member to engage the pipe and seal the portion of the opening not occupied thereby.

4. The combination with a pipe, of an outlet box having a pipe-receiving opening extending from the central portion thereof through the periphery, the inner wall of said opening being positioned so that when the pipe is thereagainst it will be concentrically situated, said outlet box having a wedging surface, a combined clamping and sealing member engaging said surface and the pipe and shaped to close the portion of said opening not occupied by the pipe, and means to clamp said member between the wedging surface and the pipe.

5. The combination with a pipe, of an outlet box comprising separable sections adapted to embrace the pipe, one of said sections having a pipe receiving opening extending from the center portion thereof through the periphery, each section having a pipe-engaging wall and said sections having interengaging wedging surfaces at the periphery and pipe engaging portions thereof, and means connecting said sections and coöperating with the wedging surfaces to clamp both sections to the pipe.

In testimony whereof, I have signed my name to this specification.

MINER ROBINSON.